(12) United States Patent
Arakawa

(10) Patent No.: US 11,042,182 B1
(45) Date of Patent: Jun. 22, 2021

(54) COMMUNICATION DEVICE, COMMUNICATION SYSTEM, AND RECORDING MEDIUM

(71) Applicant: Mitsubishi Electric Corporation, Tokyo (JP)

(72) Inventor: Satoshi Arakawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/259,560

(22) PCT Filed: Sep. 19, 2018

(86) PCT No.: PCT/JP2018/034690
§ 371 (c)(1),
(2) Date: Jan. 12, 2021

(87) PCT Pub. No.: WO2020/059054
PCT Pub. Date: Mar. 26, 2020

(51) Int. Cl.
*G06F 1/10* (2006.01)
*G06F 13/362* (2006.01)
*G06F 9/4401* (2018.01)

(52) U.S. Cl.
CPC .............. *G06F 1/10* (2013.01); *G06F 9/4418* (2013.01); *G06F 13/362* (2013.01)

(58) Field of Classification Search
CPC ........ G06F 1/10; G06F 13/362; G06F 9/4418; G06F 9/4401; G06F 9/4405; G06F 9/4406; G06F 9/4411; G06F 9/445
See application file for complete search history.

(56) References Cited

U.S. PATENT DOCUMENTS

| 6,643,792 B1 * | 11/2003 | Kurosawa | G06F 1/12 713/400 |
| 7,483,370 B1 * | 1/2009 | Dayal | G06F 11/2038 370/219 |
| 10,739,231 B2 * | 8/2020 | Ogawa | H04L 12/4604 |
| 2005/0083863 A1 * | 4/2005 | Umei | H04L 12/42 370/299 |

(Continued)

FOREIGN PATENT DOCUMENTS

| JP | 2007-26033 A | 2/2007 |
| JP | 2013-30932 A | 2/2013 |

(Continued)

OTHER PUBLICATIONS

International Search Report and Written Opinion dated Nov. 27, 2018, received for PCT Application PCT/JP2018/034690, Filed on Sep. 19, 2018, 10 pages including English Translation.

(Continued)

*Primary Examiner* — Raymond N Phan
(74) *Attorney, Agent, or Firm* — Xsensus LLP

(57) ABSTRACT

A first PHY (121) transmits and receives signals, at a physical layer, to and from a second PHY (142) in a communication device (101) through a communication cable (601). The first PHY (121) is set as a clock master to transmit, to the second PHY (142), a clock signal defining timing for transmitting and receiving signals. A device controller (151), in response to detection of a set event, completes initialization of the first PHY (121) set as the clock master after completion of initialization of the second PHY (142) set as a clock slave.

20 Claims, 7 Drawing Sheets

(56) References Cited

U.S. PATENT DOCUMENTS

| | | | |
|---|---|---|---|
| 2006/0072624 A1 | 4/2006 | Akita et al. | |
| 2008/0131139 A1* | 6/2008 | Ishibashi | H04B 10/278 |
| | | | 398/155 |
| 2009/0072954 A1* | 3/2009 | Kim | H04B 3/54 |
| | | | 375/285 |
| 2012/0154342 A1* | 6/2012 | Hotta | G02F 1/13306 |
| | | | 345/204 |
| 2013/0114746 A1* | 5/2013 | Sekino | H04B 3/04 |
| | | | 375/257 |
| 2014/0355988 A1 | 12/2014 | Nishikawa | |
| 2016/0359670 A1 | 12/2016 | Asai | |
| 2018/0331907 A1* | 11/2018 | Lusted | H04L 41/0886 |

FOREIGN PATENT DOCUMENTS

| | | |
|---|---|---|
| JP | 2014-232952 A | 12/2014 |
| WO | 2005/039121 A1 | 4/2005 |
| WO | 2016/120976 A1 | 8/2016 |

OTHER PUBLICATIONS

Notice of Reasons for Refusal dated Jun. 18, 2019, received for JP Application 2019-526333, 8 pages including English Translation.
Decision to Grant dated Oct. 1, 2019, received for JP Application 2019-526333, 5 pages including English Translation.

* cited by examiner

COMMUNICATION DEVICE, COMMUNICATION SYSTEM, AND RECORDING MEDIUM

CROSS-REFERENCE TO RELATED APPLICATION

The present application is based on PCT filing PCT/JP2018/034690, filed Sep. 19, 2018, the entire contents of which are incorporated herein by reference.

TECHNICAL FIELD

The present disclosure relates to a communication device, a communication system, and a recording medium.

BACKGROUND ART

For communication devices to communicate with each other, the same communication method is to be used. The communication devices may use, for example, autonegotiation under the standard defined as the Institute of Electrical and Electronics Engineers (IEEE) 802.3 for Ethernet (registered trademark). Autonegotiation automatically sets an optimum communication method in a physical layer circuit serving as a physical layer of the Open Systems Interconnection (OSI) reference model. Autonegotiation automatically sets an optimum transmission speed and an optimum communication mode. Setting a communication mode refers to setting an optimum mode selected from full-duplex communication and half-duplex communication.

Autonegotiation typically uses automatic identification of a communication cable called an auto-medium dependent interface (Auto MDI)/medium dependent interface crossover (MDI-X). Communication devices enabled with the Auto MDI/MDI-X function can automatically identify the type of communication cable.

For high-speed communication, communication devices precisely meet signal transmission or receipt timing to avoid loss of frames caused by clock errors between the communication devices.

Under IEEE 802.3, in order to synchronize the physical layer circuits in paired communication devices in Gigabit Ethernet (registered trademark), such as 1000BASE-T, the following matters are prescribed. The physical layer circuit in one communication device is set as a master (clock master) or a provider of synchronization clock signals. The physical layer circuit in the other communication device, or a destination communication device, is set as a slave (clock slave) that operates in accordance with clock signals provided by the clock master. The clock master transmits data including a clock signal indicating the clock of the clock master to the clock slave. The clock slave regenerates the clock signal of the clock master using the data received from the clock master, and transmits data to the clock master in accordance with the regenerated clock signal. This allows the two communication devices to transmit or receive data in synchronization.

Initialization of the physical layer circuit set as the clock slave is to be completed before the clock master transmits data including a clock signal to the clock slave. This is due to, when the initialization of the physical layer circuit set as the clock slave is incomplete, the clock slave cannot receive data including a clock signal from the clock master. This configuration thus involves timing adjustment between completion of the initialization of the physical layer circuit, set as the clock slave, and transmission of data including a clock signal from the physical layer circuit, set as the clock master, to the physical layer circuit as the clock slave.

When autonegotiation described above is enabled on the communication devices, autonegotiation automatically sets the clock master and the clock slave to control the physical layer circuit in one communication device set as the clock master to transmit data including a clock signal indicating the clock to the physical layer circuit in the other communication device set as the clock slave, after the initialization of the physical layer circuits in the two communication devices is complete. Autonegotiation eliminates manual timing adjustment between the completion of the initialization of the clock slave and data transmission of the clock master.

However, for the purpose of determining an optimum communication method for communication devices in autonegotiation, the communication devices are to transmit, to each other, pulses called a fast link pulse (FLP). Such autonegotiation thus takes a certain period of time.

In environments with infrequent link-downs, autonegotiation does not greatly degrade the communication efficiency after a link-up. In factory automation, for example, jigs attached to the arms of industrial robots or welders are replaced as appropriate. In this field, communication between an industrial robot and a programmable logic controller that controls the industrial robot may be frequently disconnected. After jigs for the arms of an industrial robot or a welder are replaced, another link-up is to be established in communication between the industrial robot and the programmable logic controller. Autonegotiation performed many times in such situations uses time and lowers the work efficiency.

Patent Literature 1 describes an example method for reducing time for autonegotiation. The method includes enabling autonegotiation and Auto MDI/MDI-X in advance, storing communication setting information including a determined communication speed, determination as to whether the communication device is a clock master or a clock slave, and determination as to whether MDI or MDI-X is used. Autonegotiation is then disabled, and a link-up is established using the stored communication setting information.

CITATION LIST

Patent Literature

Patent Literature 1: International Publication No. WO 2016/120976

SUMMARY OF INVENTION

Technical Problem

Patent Literature 1 does not describe timing adjustment between completion of the initialization of a clock slave and data transmission of the clock master. When communication devices that perform high-speed communication in accordance with a telecommunications standard such as 1000BASE-T use the configuration described in Patent Literature 1 to reduce the time taken for autonegotiation, the communication devices may cause clock errors and cannot establish a link-up without timing adjustment between completion of initialization of a clock slave and data transmission of the clock master, or may cause loss of frames after a link-up is possibly established. When affected by more loss of frames, the communication devices may fail to perform communication between them. The configuration described in Patent Literature 1 may thus be inapplicable to high-speed communication in accordance with a telecommunications standard such as 1000BASE-T.

In response to the above issue, an objective of the disclosure is to establish a link-up between communication devices that perform communication involving clock synchronization between physical layer circuits in paired communication devices without autonegotiation and automatic identification for communication cables.

Solution to Problem

To achieve the above objective, a communication device according to an aspect of the present disclosure includes a first physical layer circuit to transmit and receive signals, at a physical layer, to and from a second physical layer circuit in a second communication device connected to the first physical layer circuit through a communication line. The first physical layer circuit is set as a clock master to transmit a clock signal defining timing for transmitting and receiving signals to and from the second physical layer circuit. The communication device includes a first controller to, in response to detection of a set event, complete initialization of the first physical layer circuit set as the clock master after completion of initialization of the second physical layer circuit in the second communication device, the second physical layer circuit being set as a clock slave.

Advantageous Effects of Invention

The communication device according to the present disclosure completes initialization of the physical layer circuit set as a clock master after completion of initialization of the physical layer circuit set as the clock slave in a counterpart communication device. This timing adjustment between the completion of the initialization of the clock slave and the completion of the initialization of the clock master enables link-up establishment of communication devices that perform high-speed communication involving clock synchronization between physical layer circuits without autonegotiation and automatic identification for communication cables.

DESCRIPTION OF EMBODIMENTS

Communication devices 100 to 102 according to Embodiment 1 of the present disclosure will now be described in detail with reference to the drawings.

Embodiment 1

Figure 1:
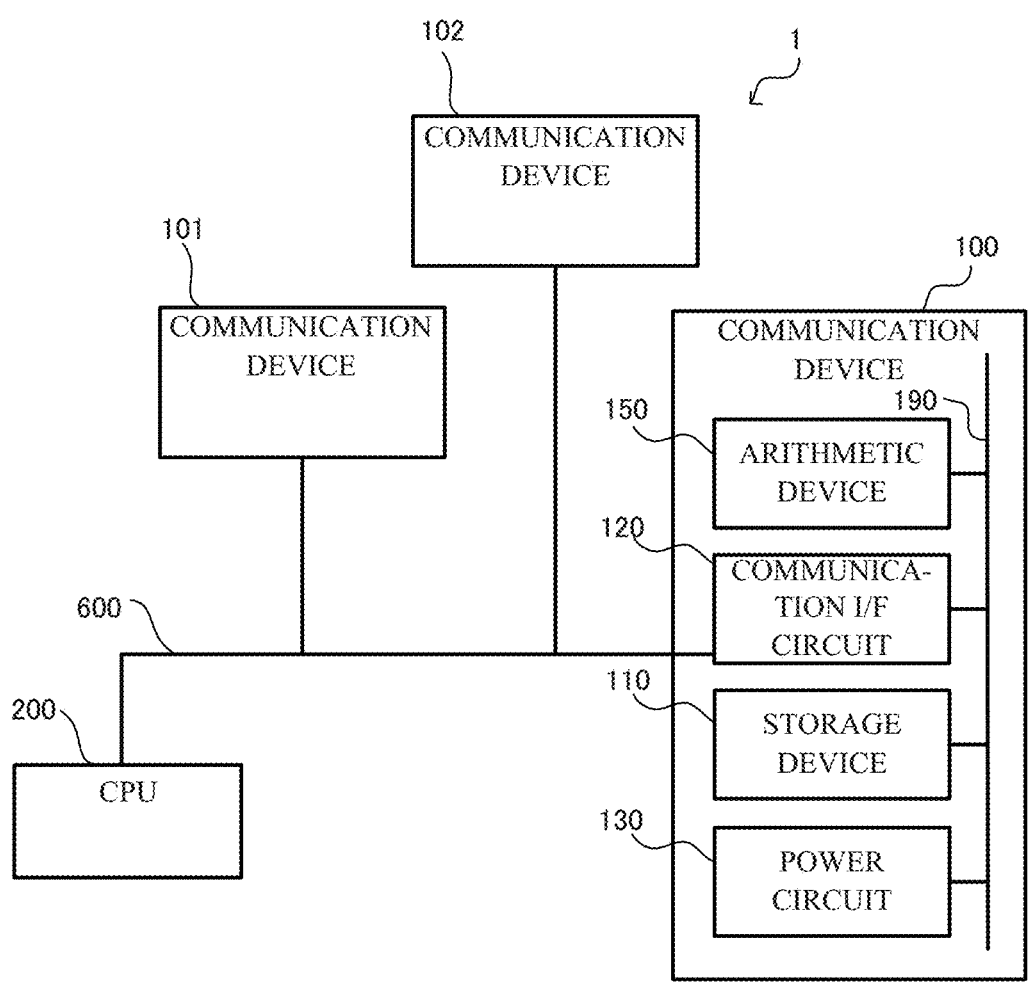
FIG. 1 is a block diagram of a communication device according to Embodiment 1 showing its hardware configuration.

As shown in FIG. 1, the communication devices 100 to 102 according to Embodiment 1 of the present disclosure are communication devices included in a programmable logic controller 1. The programmable logic controller 1 includes the communication devices 100 to 102 and a central processing unit (CPU) 200. The programmable logic controller 1 controls, for example, a detector or a controlled device that operates in a production system or a control system. The communication devices 100 to 102 enable link-up establishment without autonegotiation and automatic identification of a communication cable. A link-up herein refers to the state of each of the communication devices 100 to 102 ready to perform communication with another communication device at the physical layer level. In other words, a link-up refers to the state of a physical layer circuit in each of the communication devices 100 to 102 to transmit or receive electrical signals to or from a physical layer circuit in another communication device.

The communication devices 100 and 101 are connected to each other with a field bus 600 to communicate with each other. The communication devices 100 and 102 are connected to each other with the field bus 600 to communicate with each other. In Embodiment 1, an example of the communication device 100 is a network unit. An example of the communication device 101 is an industrial robot. An example of the communication device 102 is an information processor. The communication devices 100 to 102 communicate with one another in synchronization. The communication devices 100 to 102 are designed to perform such synchronization.

Although the communication device 100 will now be mainly described, the communication devices 101 and 102 have the same communication capabilities as the communication device 100.

As shown in FIG. 1, the communication device 100 includes, as hardware components, a storage device 110 that stores various items of data, a communication interface (I/F) circuit 120 that performs communication with other devices, a power circuit 130 that generates intended output power based on input power, and an arithmetic device 150 that controls the entire communication device 100. The storage device 110, the communication IF circuit 120, and the power circuit 130 are connected to the arithmetic device 150 with a bus 190 to communicate with the arithmetic device 150.

The storage device 110 includes a volatile memory and a nonvolatile memory to store programs and various items of data. The storage device 110 is used as a work memory of the arithmetic device 150.

The communication I/F circuit 120 converts data provided from the arithmetic device 150 to electrical signals, and transmits the converted electrical signals to other communication devices. The communication IF circuit 120 reconstructs the electrical signals received from other communication devices to data, and outputs the data to the arithmetic device 150. Examples of data provided from the arithmetic device 150 to the communication I/F circuit 120 include control signals addressed to the communication device 101.

The power circuit 130 converts power supplied to the communication device 100. For example, the power circuit 130 performs voltage transformation, frequency conversion, or alternate current to direct current conversion.

The arithmetic device 150 includes a CPU. The arithmetic device 150 executes the various programs stored in the storage device 110 to implement various functions of the communication device 100.

The CPU 200 controls the entire programmable logic controller 1. The CPU 200 and the communication devices 100 to 102 are connected to each other with the field bus 600 to communicate with each other.

Figure 2:
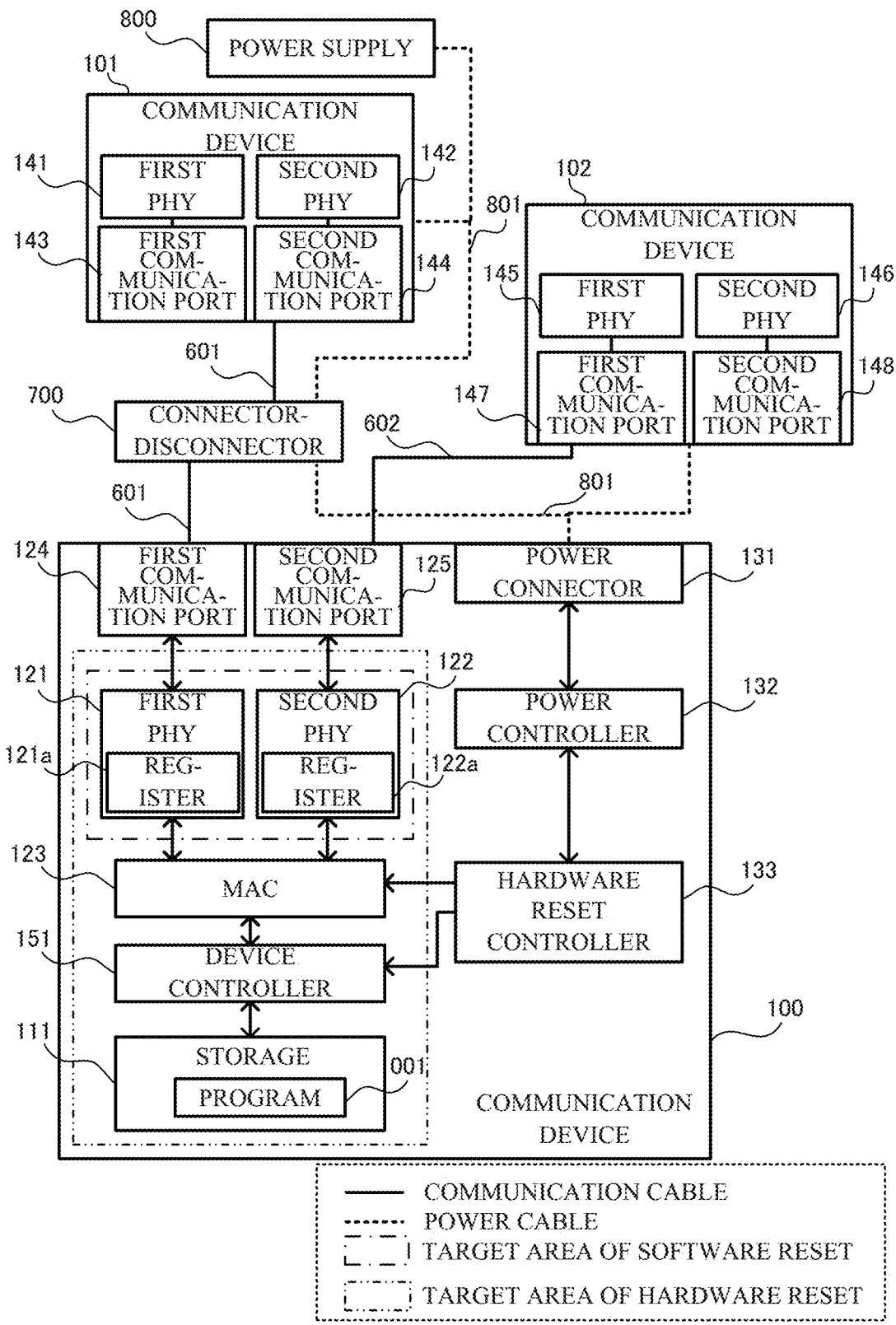
FIG. 2 is a functional block diagram of the communication device according to Embodiment 1.

As shown in FIG. 2, the communication device 100 includes, as functional units, a storage 111 that stores programs and various parameters, a first physical (PHY) 121 and a second PHY 122 serving as physical layers, a media access control (MAC) 123 serving as a data link layer, a first communication port 124 and a second communication port 125 for connecting the communication device 100 to other communication devices, a power controller 132 that controls power supply to each component, a hardware reset controller 133 that controls hardware reset, and a device controller 151 that controls software reset in the first PHY 121 and the second PHY 122.

Although the communication device 100 will now be mainly described, the communication devices 101 and 102 have the same configuration as the communication device 100. In FIG. 2, for convenience of illustration, the components of the communication device 101 are not shown except a first PHY 141, a second PHY 142, a first communication port 143, and a second communication port 144. The components of the communication device 102 are not shown except a first PHY 145, a second PHY 146, a first communication port 147, and a second communication port 148. FIG. 2 does not show the CPU 200.

The storage 111 stores a program 001 to be executed by the device controller 151 (described later). The program 001 is, for example, executed by the arithmetic device 150 to implement firmware. The storage 111 stores parameters for link-up establishment of the communication device 100. The parameters for link-up establishment include information indicating whether the first PHY 121 is a clock master or a clock slave, information indicating whether the second PHY 122 is a clock master or a clock slave, the type of communication cable, the communication speed, and the communication mode. The clock master is a PHY that provides clock signals, and the clock slave is a PHY that operates in synchronization with clock signals received from the clock master.

The first PHY 121 and its counterpart PHY communicate with each other in synchronization. Thus, the information indicating whether the first PHY 121 is a clock master or a clock slave indicates whether the first PHY 121 provides or receives clock signals for synchronization. The same applies to the information indicating whether the second PHY 122 is a clock master or a clock slave. The information about the type of communication cable stored in the storage 111 is, for example, information indicating whether the communication cable is a straight cable or a crossover cable. The information about the communication mode stored in the storage 111 is, for example, information indicating whether the communication mode is full-duplex communication or half-duplex communication. The storage 111 is implemented by the storage device 110.

These parameters for link-up establishment of the communication device 100 are predetermined by, for example, enabling autonegotiation between the communication devices 100 to 102 and Auto MDI/MDI-X. After the parameters for link-up establishment are determined, autonegotiation between the communication devices 100 to 102 and Auto MDI/MDI-X are disabled.

The first PHY 121 includes a physical layer circuit serving as a physical layer, or a first layer in the Open Systems Interconnection (OSI) reference model, and is connected to a connector of the first communication port 124. The first communication port 124 is connected to the second communication port 144 in the communication device 101 with a communication cable 601. The second PHY 142 in the communication device 101 is connected to the second communication port 144. Thus, the first PHY 121 is physically connected to the second PHY 142 in the communication device 101 to communicate with the second PHY 142 in the communication device 101. Before communicating with the second PHY 142 in the communication device 101, the first PHY 121 determines physical settings for communication and writes the determined settings into a register 121a. Information written in the register 121a includes the communication speed, information indicating whether the communication device 100 serves as a clock master or a clock slave for the communication device 101, and the type of cable used for connection with the communication device 101. The first PHY 121 is implemented by the communication IF circuit 120.

The second PHY 122 includes a physical layer circuit serving as a physical layer, or a first layer in the OSI reference model, and is connected to a connector of the second communication port 125. The second communication port 125 is connected to the first communication port 147 in the communication device 102 with a communication cable 602. The first PHY 145 is connected to the first communication port 147. The second PHY 122 is thus physically connected to the first PHY 145 in the communication device 102 to communicate with the first PHY 145 in the communication device 102. Before communicating with the first PHY 145 in the communication device 102, the second PHY 122 determines physical settings for communication and writes the determined settings into a register 122a. Information written in the register 122a includes the communication speed, information indicating whether the communication device 100 serves as a clock master or a clock slave for the communication device 102, and the type of cable used for connection with the communication device 102. The second PHY 122 is implemented by the communication I/F circuit 120.

The first PHY 121 and the counterpart second PHY 142 are to be synchronized to transmit or receive data at the same timing. Thus, either the first PHY 121 or the second PHY 142 transmits, to the other, a clock signal that defines communication timing for synchronization with the other. The second communication port 125 is connected to the first communication port 147 in the communication device 102 with the communication cable 602. The second PHY 122 is physically connected to the first PHY 145 in the communication device 102.

For ease of understanding, the first PHY 121 in the communication device 100 is hereafter set as a clock master, and the second PHY 142 in the counterpart communication device 101 is hereafter set as a clock slave. The first PHY 145 in the communication device 102 is set as a clock master, and the second PHY 122 in the counterpart communication device 100 is set as a clock slave. The first PHY 121 functioning as a clock master provides clock signals to the second PHY 142 in the communication device 101 functioning as a clock slave. The clock signals define timing for transmitting or receiving data.

The MAC 123 is a data link layer circuit serving as a data link layer, or a second layer in the OSI reference model. The MAC 123 is implemented by the communication IF circuit 120. The MAC 123 is connected to the first PHY 121 and the second PHY 122 to communicate with a data link layer circuit in a MAC (not shown) in the communication device 101.

The first communication port 124 includes a connector to which the communication cable 601 is connectable, and is connected to the second communication port 144 in the communication device 101 with the communication cable 601. The first communication port 124 is connected to the first PHY 121. Signals output from the first PHY 121 are thus transmitted to the communication device 101 through the first communication port 124.

The second communication port 125 includes a connector to which the communication cable 602 is connectable, and is connected to the first communication port 147 in the communication device 102 with the communication cable 602. The second communication port 125 is connected to the second PHY 122. Signals output from the second PHY 122 are thus transmitted to the communication device 102 through the second communication port 125.

As described above, the first PHY 121 in the communication device 100 is set as a clock master, and the second PHY 142 in the counterpart communication device 101 is set as a clock slave. The first PHY 121 connected to the first communication port 124 is an example of a first physical layer circuit. The second PHY 142 in the communication device 101 is an example of another physical layer circuit. The second PHY 142 in the communication device 101 is an example of a second physical layer circuit. The communication device 100 is an example of a communication device. The communication device 101 is an example of a second communication device. The communication cable 601 is an example of a communication line.

A power cable 801 is connected to a power connector 131. Power is supplied to the communication device 100 from a power supply 800 via the power cable 801.

The power controller 132 converts power supplied from the power supply 800 into power appropriate for the communication device 100, and supplies the resulting power to each component of the communication device 100. The power controller 132 is implemented by the power circuit 130.

The hardware reset controller 133 controls hardware reset and hardware reset cancellation of each component of the communication device 100. More specifically, when the power supply is started, the hardware reset controller 133 outputs hardware reset signals to components of the communication device 100 including the first PHY 121, the second PHY 122, the MAC 123, and the device controller 151. When a predetermined time elapses after the start of power supply, the hardware reset controller 133 cancels the hardware reset signals, or stops outputting hardware reset signals to the components of the communication device 100. The hardware reset controller 133 cancels the hardware reset signals when a predetermined time elapses after the start of power supply to stand by until the components of the communication device 100 fully receive power to enable stable operation. The arithmetic device 150 executes a boot loader stored in the storage device 110 to implement the hardware reset controller 133.

The first PHY 121, the second PHY 122, the MAC 123, and the device controller 151 are reset with hardware reset. The volatile memory in the storage 111 is initialized. The hardware reset controller 133 monitors the power supply voltage fed to the communication device 100, and continues outputting reset signals to each component until the power supply voltage satisfies predetermined conditions.

As described above, hardware reset is cancelled after the first PHY 121 and the second PHY 122 start fully receiving power. The registers 121a and 122a are to be initialized with software reset. Thus, the first PHY 121 and the second PHY 122 cannot start initialization for starting communication unless hardware reset and software reset (described later) are cancelled.

The device controller 151 implements at least one of the third to seventh layers in the OSI reference model. The device controller 151 controls the first PHY 121 and the second PHY 122. The device controller 151 is implemented by the arithmetic device 150. The device controller 151 is an example of a first controller.

The device controller 151 executes software reset on the first PHY 121 and the second PHY 122 at predetermined timing. Software reset causes, for example, initialization of the registers 121a and 122a. The device controller 151 can individually output or stop outputting software reset signals to the first PHY 121 and the second PHY 122. The device controller 151 is implemented by the arithmetic device 150.

A connector-disconnector 700 is located between the communication devices 100 and 101 to connect or disconnect the power cable 801 and the communication cable 601 between the communication devices 100 and 101. When the connector-disconnector 700 disconnects the power cable 801 and the communication cable 601, the communication devices 100 and 101 cannot communicate with each other. The connector-disconnector 700 is an example of switch means for switching between connection and disconnection of the power cable.

In Embodiment 1, the connector-disconnector 700 is, for example, a tool changer between an arm of an industrial robot and a jig. When the jig is detached from the arm, the connector-disconnector 700 serving as a tool changer disconnects the power cable 801 and the communication cable 601. When a new jig is attached to the arm, the tool changer reconnects the power cable 801 and the communication cable 601. Every replacement of a jig on the arm causes communication to be disconnected and reconnected between the communication devices 100 and 101 and between the communication devices 100 and 102.

The power supply 800 supplies power to the communication devices 100 to 102. As shown in the figure, the power cable 801 extending from the connector-disconnector 700 to the communication devices 100 and 102 is bifurcated into two cables. One of the cables bifurcated from the power cable 801 is connected to the power connector 131 in the communication device 100, and the other of the cables is connected to a power connector (not shown) in the communication device 102. As described above, the connector-disconnector 700 between the communication devices 100 and 101 connects or disconnects the power cable 801 between the communication devices 100 and 101. Thus, power is supplied to the communication devices 100 and 102 while the connector-disconnector 700 is connecting the power cable 801 connecting the communication devices 100 and 101. In contrast, when the connector-disconnector 700 disconnects the power cable 801 connecting the communication devices 100 and 101, power supply to the communication devices 100 and 102 is stopped. When power supply is stopped, the communication devices 100 and 102 cannot operate.

As shown in the figure, power from the power supply 800 is directly supplied to the communication device 101 that is an industrial robot. While the power supply 800 is in operation, power supply to the communication device 101 is not stopped although the connector-disconnector 700 disconnects the power cable 801.

As described above, the communication is frequently disconnected and reconnected. Thus, in Embodiment 1, autonegotiation for the communication devices 100 to 102 is disabled in advance to perform control such that initialization of a PHY set as a clock slave to be performed without autonegotiation is completed and then initialization of a PHY set as a clock master is to be started.

Figure 3:
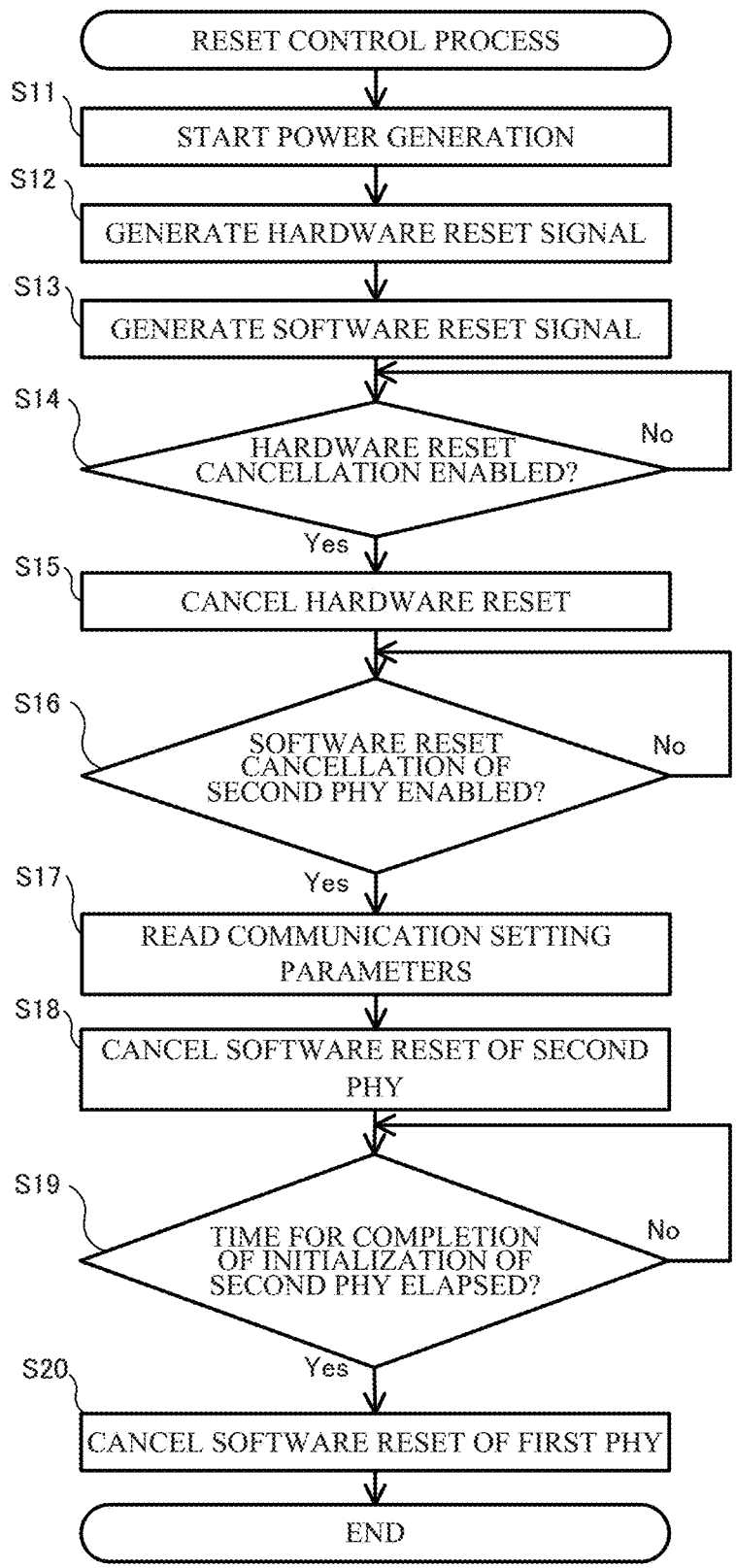
FIG. 3 is a flowchart of a reset control process according to Embodiment 1.

With reference to FIG. 3, a method used by the communication device 100 for controlling the start timing of initialization of the first PHY 121 and the second PHY 122 will be described. When the communication device 100 receives power from the power supply 800 after receiving no power and without performing communication, the components of the communication device 100 perform the processing described below. In the processing described below, parameters indicating the first PHY 121 as a clock master and the second PHY 122 as a clock slave are prestored in the storage 111.

The connector-disconnector 700 connects the power cable 801 for the power supply 800 and the communication device 100. The processing in FIG. 3 is started in response to an event of turning-on the communication device 100.

The power controller 132 starts generating power appropriate for operating the communication device 100 from power supplied via the power connector 131 (step S11). When the power supply is started, the hardware reset controller 133 generates hardware reset signals (step S12). The hardware reset controller 133 continuously outputs hardware reset signals to the components of the communication device 100 including the first PHY 121, the second PHY 122, the MAC 123, and the device controller 151 until the conditions for enabling hardware reset cancellation are satisfied.

When the communication device 100 is turned on, the device controller 151 generates software reset signals (step S13), and outputs the software reset signals to the first PHY 121 and the second PHY 122.

The hardware reset controller 133 stands by until hardware reset cancellation is enabled (step S14). In Embodiment 1, the hardware reset controller 133 determines that hardware reset cancellation is enabled upon elapse of a predetermined time after the communication device 100 is turned on. For example, the hardware reset controller 133 stands by until the output voltage of the power controller 132 reaches the level at which the communication device 100 can operate entirely and the time taken for stabilizing the oscillations of a phase locked loop (PLL) for clock synchronization elapses. When hardware reset cancellation is enabled after elapse of a predetermined time (Yes in step S14), the hardware reset controller 133 cancels hardware reset (step S15), or stops outputting hardware reset signals.

The device controller 151 determines whether software reset cancellation of the second PHY 122 is enabled (step S16). In step S16, the device controller 151 reads the program 001 for initializing the second PHY 122 from the storage device 110. When reading the program 001 and being ready to execute the program 001 upon elapse of a predetermined time, the device controller 151 determines that the software reset cancellation of the second PHY 122 is enabled (Yes in step S16). The device controller 151 performs the processing described below by executing the program 001.

The device controller 151 reads the communication setting parameters stored in the storage 111 (step S17). The device controller 151 cancels software reset of the second PHY 122 (step S18). More specifically, the device controller 151 writes the parameters read from the storage 111 into the register 122a of the second PHY 122. Thus, the second PHY 122 starts initialization.

The device controller 151 stands by until the time taken for completion of initialization of the second PHY 122 elapses (step S19). The time taken for the completion of the initialization of the second PHY 122 includes the time until the processing for link-up establishment of the second PHY 122 is complete and the time until the oscillations of a PLL included in the second PHY 122 are stabilized.

When the time taken for the completion of the initialization of the second PHY 122 and a predetermined stand-by time elapse (Yes in step S19), the device controller 151 cancels software reset of the first PHY 121 (step S20), and writes the parameters read from the storage 111 into the register 121a of the first PHY 121. Thus, the first PHY 121 starts initialization. When initialization of the first PHY 121 is complete, the communication device 100 is ready for link-up establishment.

The communication devices 101 and 102, each serving as a counterpart of the communication device 100, also perform the same processing as the above processing. When each counterpart completes the same processing as above, link-up establishment is complete. Thus, communication is enabled between the communication devices 100 and 101 and between the communication devices 100 and 102.

When communication is enabled between the communication devices 100 and 101 and between the communication devices 100 and 102, the communication device including a PHY set as a clock master transmits a clock signal to a communication device including a PHY set as a clock slave for clock synchronization.

In step S14 in the flowchart in FIG. 3, the hardware reset controller 133 determines that hardware reset cancelation is enabled when a predetermined time elapses after the communication device 100 is turned on. In step S16, the device controller 151 determines that software reset cancellation of the second PHY 122 set as a clock slave is enabled when a predetermined time elapses after hardware reset cancellation. In step S19, the device controller 151 determines whether a predetermined time has elapsed from when the second PHY 122 starts initialization. The stand-by time in each step is determined in the manner described below.

In step S14, the hardware reset controller 133 is to stand by until (a1) the time taken for rising of the voltage elapses from when power is supplied to the communication device 100, (a2) the time taken for stabilizing the voltage used by the components included in the communication device 100 elapses from the rising of the voltage, and (a3) the time taken for stabilizing the oscillations of a PLL for clock synchronization elapses. The total of the time (a1) to the time (a3) is defined as a period P1. When the period P1 has elapsed, hardware reset cancelation is enabled.

The communication device 101 directly receives power from the power supply 800 without using the connector-disconnector 700, and can be determined to stably receive power. Thus, the time (a1) may be excluded from the period P1 for the communication device 101.

The time (a1) to the time (a3) can each be calculated using, for example, the specifications of the communication device 100 and the specifications of the power supply 800. The period P1 calculated by summing the time (a1) to the time (a3) is prestored in, for example, a memory included in the power circuit 130. The hardware reset controller 133 measures the elapsed time after power is supplied to the communication device 100 with a timer included in the power circuit 130, and determines whether the period P1 stored in the memory included in the power circuit 130 has elapsed. In addition to the elapsed time condition, the hardware reset controller 133 may also determine whether the voltage condition is satisfied, or for example, whether an output of the power controller 132 has reached a determined level.

In step S16, the device controller 151 is to stand by for a period until software reset cancelation is enabled after the hardware reset cancellation (hereafter referred to as a period P2). When the device controller 151 executes the program 001 and writes communication setting parameters into the register 122a in the second PHY 122, the second PHY 122 starts initialization. Thus, in step S16 in Embodiment 1, the device controller 151 determines whether the time taken for reading the program 001 from the storage device 110 has elapsed from the hardware reset cancellation. When the period P2 has elapsed, software reset cancelation is enabled.

The program reading period varies depending on the size of the program 001. Thus, the longest allowable reading time is defined as the period P2. When the program 001 cannot be read within the defined time, the device controller 151 operates, for example, in the manner described below. The device controller 151 may read, in the period P2, a portion of the program 001 including link-up establishment of the communication device 100, and may read the rest of the program 001 after the link-up establishment is complete.

In step S19, the device controller 151 stands by for a period taken from the start of initialization of the second PHY 122 to the completion of initialization (hereafter referred to as a period P3), and the stand-by time set until completion of initialization of the second PHY of another communication device set as a clock slave (hereafter referred to as a period P4). The period P3 can be calculated using the specifications of the communication device 100.

In each of the communication devices 100 to 102, the first PHYs set as clock masters are initialized after completion of initialization of all the second PHYs set as clock slaves is complete. Thus, the period P4 can be obtained from the periods P1, P2, and P3 for each of the communication devices 100, 101, and 102.

Figure 4:
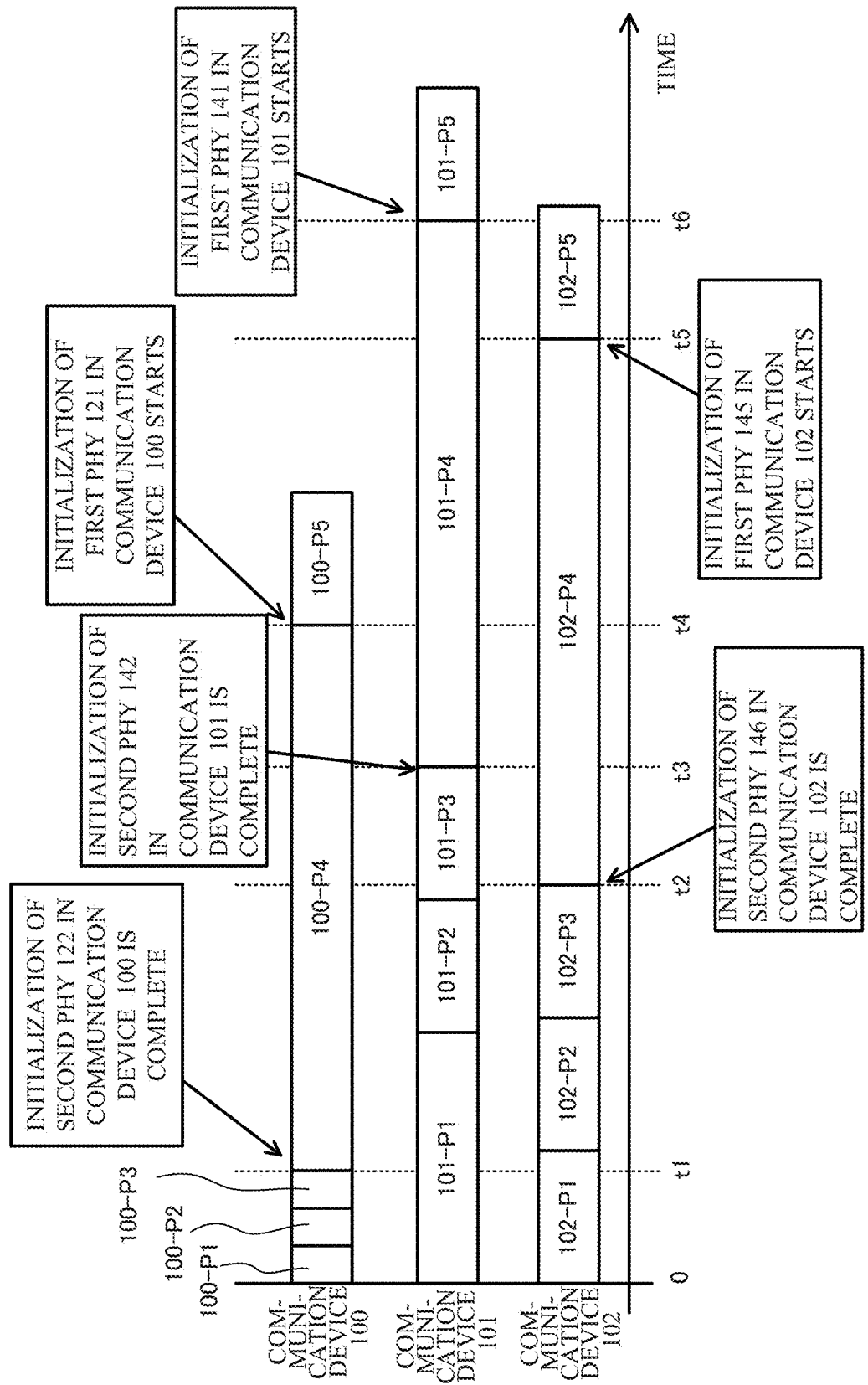
FIG. 4 is a diagram of initialization timing of physical layers (PHYs) in communication devices according to Embodiment 1.

FIG. 4 shows an example of processing timings in steps S14, S16, and S19 for the communication devices 100 to 102.

A period 100-P1 corresponds to the period P1 taken to enable hardware reset cancellation of the communication device 100. A period 101-P1 corresponds to the period P1 taken to enable hardware reset cancellation of the communication device 101. A period 102-P1 corresponds to the period P1 taken to enable hardware reset cancellation of the communication device 102. A period 100-P2 corresponds to the period P2 taken to enable software reset cancellation of the communication device 100. A period 101-P2 corresponds to the period P2 for the communication device 101, and a period 102-P2 corresponds to the period P2 for the communication device 102. A period 100-P3 corresponds to the period P3 taken for completion of initialization of the second PHY 122 in the communication device 100. A period 101-P3 corresponds to the period P3 for the communication device 101, and a period 102-P3 corresponds to the period P3 for the communication device 102.

In the illustrated example, a time point t3 at completion of initialization of the second PHY 142 in the communication device 101 is later than a time point t1 at completion of initialization of the second PHY 122 in the communication device 100. When the communication device 100 starts initializing the first PHY 121 following the completion of initialization of the second PHY 122, initialization of the first PHY 121 in the communication device 100 may be complete before completion of initialization of the second PHY 142 in the communication device 101. This may cause clock errors between the communication devices 100 and 101 to cause a link-up failure or loss of frames, and the communication devices 100 and 101 cannot communicate with each other.

Thus, the communication device 100 stands by for a period 100-P4 set as a stand-by period, from the time point t1 at which the initialization of the second PHY 122 is complete. After the stand-by, the communication device 100 starts initializing the first PHY 121 set as a clock master at a time point t4. While the communication device 100 is in stand-by, initialization of the second PHY 142 in the communication device 101 is complete. Thus, clock errors do not occur between the communication devices 100 and 101.

In the relationship between the communication devices 100 and 102, the time point t1 at completion of initialization of the second PHY 122 in the communication device 100 is earlier than a time point t2 at completion of initialization of the second PHY 146 of the communication device 102. Thus, initialization of the first PHY 145 in the communication device 102 may be started without a stand-by period. However, adjusting the timings between multiple communication devices is complicated.

In Embodiment 1, for example, all the communication devices are controlled to start initializing the first PHY after completion of initialization of the second PHY. For example, the communication device for which initialization of the second PHY is completed first may start initializing the first PHY. Thus, each of the other communication devices 100 and 102 starts initializing the first PHY after a time point t3 at completion of initialization of the second PHY 142 in the communication device 101.

Based on the above, the stand-by period may be set in the manner described below. The stand-by period is set equal to or longer than a difference between a shortest period and a longest period taken for completion of initialization of PHYs in multiple communication devices set as clock slaves. The shortest period and the longest period can be calculated by obtaining the sum of the periods P1 to P3 for each communication device. The smallest sum of the periods is determined as the shortest period, and the largest sum of the periods is determined as the longest period. In Embodiment 1, a period calculated by adding an extra period to the difference between the longest period and the shortest period is set as a stand-by period. The period thus in this manner does not affect clock synchronization, although the time taken for completion of initialization of the second PHY in any of the communication devices is longer than expected.

In the example shown in FIG. 4, among the periods taken for completion of initialization of PHYs set as clock slaves, the period taken for completion of initialization of the second PHY 142 in the communication device 101 is the longest, and the period taken for completion of initialization of the second PHY 122 in the communication device 100 is the shortest. Thus, a period calculated by adding an extra period to the difference between the total of the periods 101-P1 to 101-P3 for the communication device 101 and the total of the periods 100-P1 to 100-P3 for the communication device 100 is set as the period 100-P4 serving as a stand-by period for the communication device 100. For the communication devices 100 and 101 as well, the periods 100-P4 and 101-P4, substantially the same as the period 102-P4, are set as stand-by periods.

The period P4 serving as a stand-by period is determined in this manner. The total period of the periods 100-P1 to 100-P3 for the communication device 100 is an example of a first period. The total period of the periods 101-P1 to 101-P3 for the communication device 101 is an example of a second period.

The stand-by period is set as shown in FIG. 4. As a result, between the communication devices 100 and 101 shown in FIG. 2, initialization of the second PHY 122 in the communication device 100 set as a clock master is started after completion of initialization of the second PHY 142 in the communication device 101 set as a clock slave.

Between the communication devices 100 and 102, initialization of the first PHY 145 in the communication device 102 set as a clock master is started after completion of initialization of the second PHY 122 in the communication device 100 set as a clock slave.

In Embodiment 1, the periods P1 to P4 are set as appropriate for each of the communication devices 100 to 102. As a result, initialization of a PHY set as a clock master is controlled to be complete after completion of initialization of a PHY set as a clock slave. Thus, when a clock master transmits a clock signal, a counterpart clock slave receives the clock signal and can regenerate a clock using the received clock signal. Thus, the communication devices 100 to 102 can communicate with each other.

The second communication port 148 in the communication device 102 is not used. However, as described above, all the communication devices are to stand by until the initialization of the second PHYs set as clock slaves is complete. In this case as well, the communication device 102 is to stand by in step S19 shown in FIG. 3.

In Embodiment 1, in response to detection of an event of turning-on the communication device 100, the processing for link-up establishment between the communication devices 100 to 102 is executed. This is because of the connector-disconnector 700 interrupting and allowing power supply from the power supply to the communication device 100 as shown in FIG. 2. Besides turning-on, events include a phenomenon that triggers initialization of a PHY set as a clock master or a clock slave.

Embodiment 2

Figure 5:
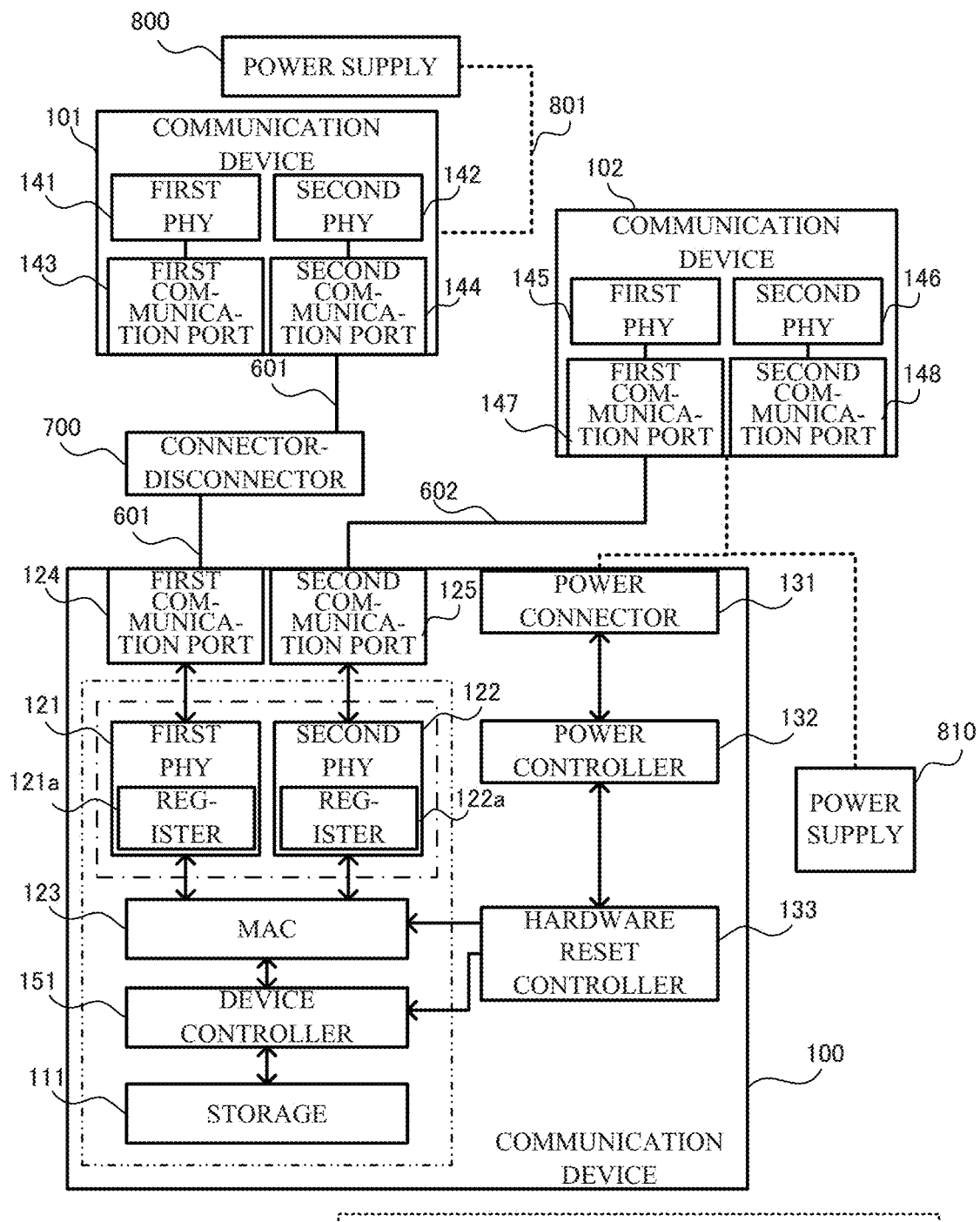
FIG. 5 is a functional block diagram of a communication device according to Embodiment 2.

The structure according to Embodiment 2 that detects events other than turning-on will now be described. As shown in FIG. 5, a communication system according to Embodiment 2 includes, instead of the power supply 800, a power supply 810 that supplies power to the communication devices 100 and 102. As shown in the figure, the connector-disconnector 700 is not located on a power cable connecting the power supply 810 and the communication device 100. The connector-disconnector 700 is not located on a power cable connecting the power supply 810 and the communication device 102. With this configuration, power supply to the communication devices 100 and 102 is not interrupted while the power supply 810 is in normal operation, unlike in Embodiment 1.

While power supply is being continued, a link-down may occur between the communication devices 100 and 101. For example, a link-down may occur when communication is disconnected by the connector-disconnector 700. Embodiment 2 assumes that communication is frequently disconnected by the connector-disconnector 700. The communication devices 100 to 102 monitor such communication disconnection, and perform link-up establishment processing again when detecting a link-down event.

The hardware configuration of the communication device 100 is similar to the configuration according to Embodiment 1 shown in FIG. 1. As shown in FIG. 5, the functional components of the communication device 100 are basically the same as the components in Embodiment 1 shown in FIG. 2 except a power supply. The processing in Embodiment 2 performed by the communication device 100 when power is turned on after being interrupted is similar to the processing according to Embodiment 1 shown in FIG. 3.

In Embodiment 2, as in Embodiment 1, the first PHY 121 in the communication device 100 is set as a clock master, the second PHY 142 in the communication device 101 is set as a clock slave, the first PHY 145 in the communication device 102 is set as a clock master, and the second PHY 122 in the communication device 100 is set as a clock slave.

Hereafter, the communication devices 100 to 102 can communicate with one another after power is turned on and the processing in FIG. 3 is executed. A communication restart process described below is performed in this state for the communication device 100 including the first PHY 121 set as a clock master when a link-down is detected between the first communication port 124 in the communication device 100 and the second communication port 144 in the communication device 101. The communication restart process is performed by the device controller 151 executing the program 001 stored in the storage 111.

When detecting a link-down, the communication device 101 also determines whether the communication cable 601 is reconnected after standing by for a predetermined period. When determining that the communication cable 601 is connected, the communication device 101 initializes the second PHY 142 set as a clock slave. The initialization timing of the second PHY 142 set as a clock slave may herein be determined independently of the initialization timing of the first PHY 121 in the communication device 100 set as a clock master. The communication restart process for the communication device 101 including the second PHY 142 set as a clock slave is not described. The communication restart process of the communication device 100 will now be described.

Figure 6:
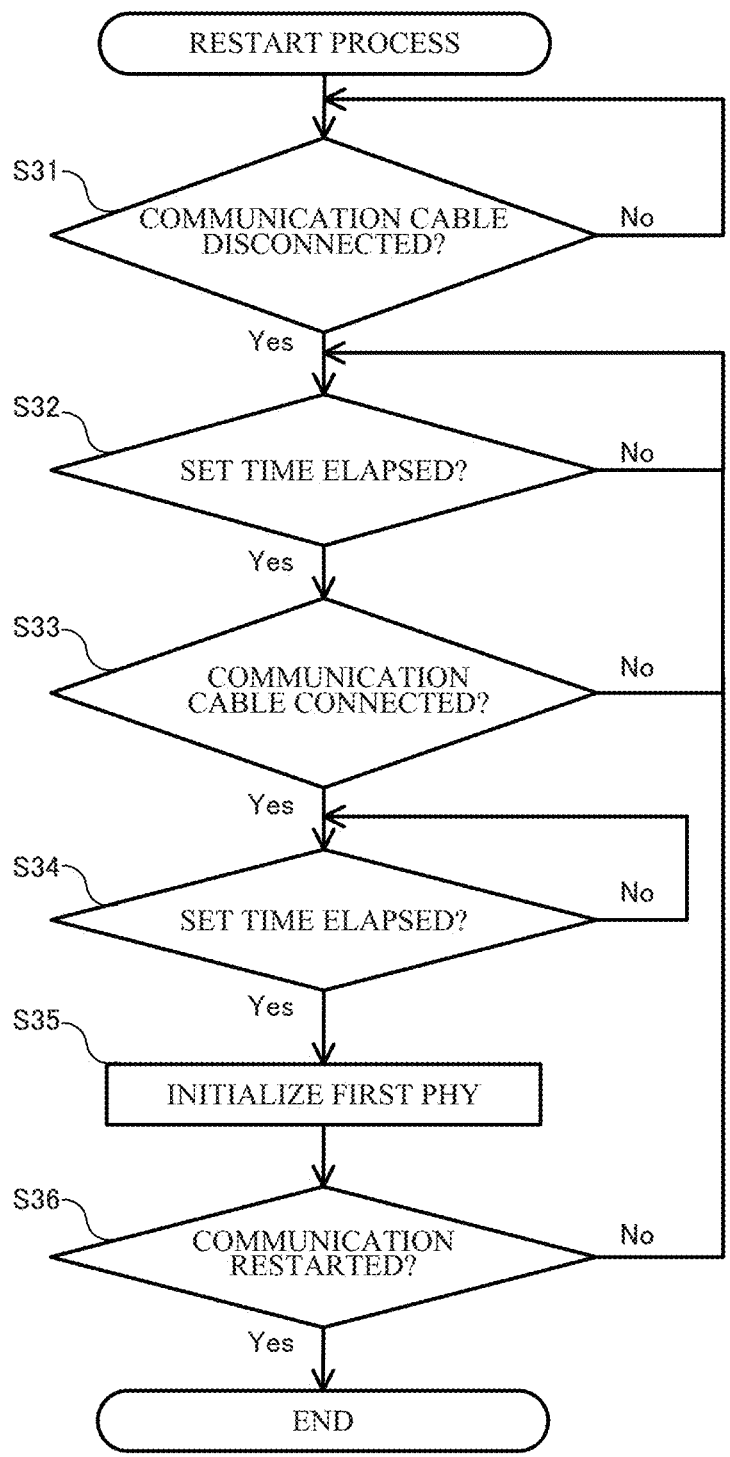
FIG. 6 is a flowchart of a restart process according to Embodiment 2.

As shown in FIG. 6, the device controller 151 in the communication device 100 determines whether the communication cable is disconnected at predetermined timing (step S31). The device controller 151 may determine that the communication cable is disconnected when, for example, no communication frame arrives for a predetermined period. In some embodiments, the device controller 151 may determine whether a communication cable is disconnected based on information detected by the first PHY 121 connected to the first communication port 124.

When determining that the communication cable is disconnected (Yes in step S31), the device controller 151 stands by until the set time elapses (No in step S32). The time for stand-by is stored in the storage 111.

When determining that the set time has elapsed (Yes in step S32), the device controller 151 determines whether the communication cable is connected (step S33). For example, the device controller 151 may determine whether the communication cable is connected based on information detected by the first PHY 121 connected to the first communication port 124.

When determining that the communication cable is connected (Yes in step S33), the device controller 151 stands by until the set time elapses (No in step S34). The device controller 151 stands by for the set time, because initialization of the first PHY 121 serving as a clock master is to be started after completion of initialization of the second PHY 142 connected to the second communication port 144 in the communication device 101 serving as a clock slave.

When determining that the set time has elapsed (Yes in step S34), the device controller 151 initializes the first PHY 121 (step S35). The device controller 151 may initialize the first PHY 121 reusing the parameters set for the register 121a. In some embodiments, software reset may be executed again on the first PHY 121, and then the parameters for the first PHY 121 stored in the storage 111 may be set for the register 121a in the first PHY 121. Thus, the first PHY 121 starts operation.

The device controller 151 determines whether communication is restarted (step S36). For example, the device controller 151 may determine whether communication is restarted after the time taken for completion of initialization has elapsed after the first PHY 121 is initialized, and then based on whether a communication frame is received by the time a predetermined time elapses. In some embodiments, the device controller 151 may determine whether communication is restarted based on information detected by the first PHY 121. When determining that communication is restarted (Yes in step S36), the device controller 151 ends the restart process. When determining that communication is not restarted (No in step S36), the device controller 151 executes the process of step S32 again. The above describes the restart process.

In Embodiment 2, instead of the power supply 800, the power supply 810 supplies power to the communication devices 100 and 102. Thus, when a link-down occurs between the first communication port 124 in the communication device 100 and the second communication port 144 in the communication device 101, a link-down may not occur between the second communication port 125 in the communication device 100 and the first communication port 147 in the communication device 102. Thus, a communication restart process is not performed on the second PHY 122 in the communication device 100 and the first PHY 145 in the communication device 102.

In Embodiment 2 described above, when a link-down is detected while power is being supplied, the communication device including a PHY set as a clock master starts initializing the PHY set as a clock master after standing by for the time for completion of initialization of a PHY of the counterpart communication device set as a clock slave. In Embodiment 2, the initialization of a PHY set as a clock master is thus controlled to be complete after initialization completion of a PHY set as a clock slave. At the timing when the clock master transmits a clock signal to the clock slave, initialization of the clock slave is complete, and clock synchronization can be performed smoothly. Thus, the paired communication devices can communicate with each other.

Modification

In Embodiments 1 and 2, the initialization of a PHY set as a clock master is started after completion of initialization of a PHY set as a clock slave. The embodiments are not limited to this example. The initialization of a PHY set as a clock master may be complete before completion of initialization of a PHY set as a clock slave. Thus, for example, the initialization of the first PHY 121 in the communication device 100 set as a clock master may be started at the timing described below.

Figure 7:
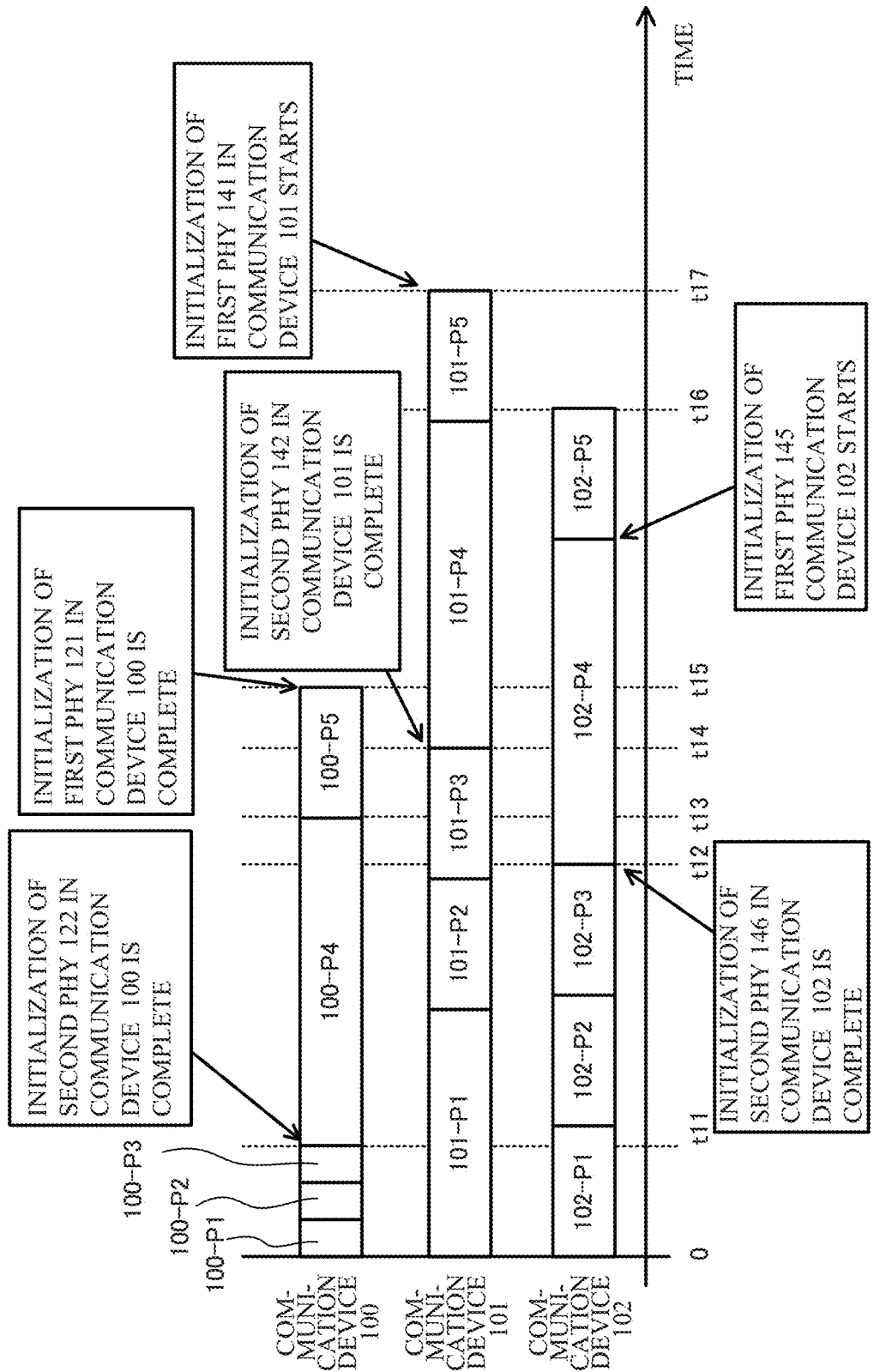
FIG. 7 is a diagram of initialization timing of PHYs in communication devices according to a modification.

In the example shown in FIG. 7, the period 100-P4 serving as a stand-by period for the communication device 100 is shorter than in the example shown in FIG. 4. Thus, a time point t13 at which initialization of the first PHY 121 in the communication device 100 set as a clock master is started is before a time point t14 at the completion of the initialization of the second PHY 142 in the counterpart communication device 101 set as a clock slave is complete. More specifically, initialization of a clock master is started before completion of initialization of a clock slave.

However, initialization of a clock slave is expected to be complete at the timing when a clock master transmits a clock signal. Thus, the period 100-P4 is set to include a time point t15 at completion of initialization of the first PHY 121 set as a clock master later than the time point t14 at completion of initialization of the second PHY 142 set as a clock slave. In the configuration according to the modification, a clock master and a clock slave can be synchronized smoothly with each other.

In the modification, initialization of the first PHY 121 set as a clock master is started earlier, but completion of initialization of the clock master is to be adjusted to be later than completion of initialization of a clock slave. Thus, the period 100-P4 serving as a stand-by period is set to allow the total of the periods 100-P1 to 100-P3, the period 100-P4 serving as a stand-by period, and the period 100-P5 to be longer than the total of the periods 101-P1 to 101-P3 that are taken for completion of initialization of the second PHYs 142 set as clock slaves. The configuration according to the modification is advantageous in that the time taken for completion of initialization of PHYs in all the communication devices set as clock masters is reduced further than in Embodiments 1 and 2.

As described above, the communication device according to each of Embodiments 1 and 2 and the modification completes initialization of a PHY set as a clock master after completion of initialization of a PHY of the counterpart communication device set as a clock slave. Thereafter, the clock master transmits a clock signal to the clock slave. The timing for completion of initialization of a slave and the timing for transmission of a clock signal from a clock master are adjusted. Thus, the clock master and the clock slave can be synchronized smoothly. In addition, autonegotiation is not performed, and the time taken to establish a link-up is thus reduced.

In Embodiment 1, the period P4 serving as a stand-by time is the same for all the communication devices 100 to 102, but the period P4 may vary among the communication devices. As shown in FIG. 4, for example, the period 101-P4 serving as a stand-by time may be shorter than the period shown in the figure for the communication device 101 for which the timing at completion of initialization of the second PHY is later than the other communication devices. This configuration can reduce the time taken for completion of initialization of the first PHY set as a clock master.

In the example shown in FIG. 4, the period 102-P4 serving as a stand-by time of the communication device 102 may be shorter than the period shown in the figure. For example, initialization of the first PHY 145 in the communication device 102 may be started at the time point t4.

Also, when the stand-by period varies among the communication devices, the stand-by period is set to allow initialization of a clock master to be complete after completion of initialization of a clock slave. Between the communication devices 100 and 101 shown in FIG. 2, initialization of the first PHY 121 in the communication device 100 set as a clock master is started after completion of initialization of the second PHY 142 in the communication device 101 set as a clock slave.

Between the communication devices 100 and 102, initialization of the first PHY 145 in the communication device 102 set as a clock master is started after completion of initialization of the second PHY 122 in the communication device 100 set as a clock slave.

Appropriately setting the periods P1 to P4 for each of the communication devices 100 to 102 controls the initialization of all the PHYs set as clock slaves to be complete before completion of initialization of all the PHYs in the communication devices 100 to 102 set as clock masters. Thus, when a clock master transmits a clock signal, a clock can be regenerated using the clock signal received by the counterpart clock slave.

In each of Embodiments 1 and 2 and the modification, the three communication devices 100 to 102 are used. However, the configuration may include four or more or two or fewer communication devices. In some embodiments, each communication device may include three or more PHYs. In the examples described above, turning-on and link-downs are examples of events. Events may further include any phenomenon that triggers initialization of a PHY.

In each of Embodiments 1 and 2, the first PHYs 121, 141, and 145 are set as clock masters, and the second PHYs 122, 142, and 146 are set as clock slaves. However, the embodiments are not limited to this structure. Two PHYs included in one communication device may both be set as clock masters. For example, the first PHY 121 and the second PHY 122 in the communication device 101 may be set as clock masters. The second PHY 142 in the communication device 101 with which the first PHY 121 communicates is set as a clock slave, and the first PHY 145 in the communication device 102 with which the second PHY 122 communicates is set as a clock slave. The communication device 100 may complete initialization of the first PHY 121 and the second PHY 122 set as clock masters after completion of initialization of clock slaves.

The functions of the communication devices 100 to 102 may be implemented by dedicated hardware or a typical computer.

Examples of a recording medium that records the above program include non-transitory computer-readable recording media such as a magnetic disk, an optical disc, a magneto-optical disc, a flash memory, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to betaken in a limiting sense, and the scope of the invention is defined only by the included claims, along with the full range of equivalents to which such claims are entitled.

REFERENCE SIGNS LIST

1 Programmable logic controller
001,002 Program
100, 101, 102 Communication device
121a, 122a Register
110 Storage device
111 Storage
120 Communication I/F circuit
121, 141, 145 First PHY
122, 142, 146 Second PHY
123 MAC
124, 143, 147 First communication port
125, 144, 148 Second communication port
130 Power circuit
131 Power connector
132 Power controller
133 Hardware reset controller
150 Arithmetic device
151 Device controller
190 Bus
200 CPU
600 Field bus
601,602 Communication cable
700 Connector-disconnector
800,810 Power supply
801 Power cable

The invention claimed is:

1. A communication device connected to a second communication device through a communication line, the communication device comprising:
a first physical layer circuit to transmit and receive signals, at a physical layer, to and from a second physical layer circuit in the second communication device, the first physical layer circuit being set as a clock master to transmit a clock signal defining timing for transmitting and receiving signals to and from the second physical layer circuit; and
a first controller to, in response to detection of a set event, stand by for a set period for completion of initialization of the second physical layer circuit in the second communication device set as a clock slave and complete initialization of the first physical layer circuit after the completion of the initialization of the second physical layer circuit in the second communication device, wherein
the set period is a sum of a first period and a predetermined stand-by period, the first period including
(i) a period taken to enable hardware reset cancellation of the communication device,
(ii) a period taken to enable software reset cancellation of the communication device after the hardware reset cancellation of the communication device is enabled, and
(iii) a period taken to complete initialization of another physical layer circuit other than the first physical layer circuit after the software reset cancellation of the communication device is enabled, the another physical layer circuit being set as a clock slave and included in the communication device.

2. The communication device according to claim 1, wherein
the predetermined stand-by period is set to be equal to or longer than a difference between the first period and a second period in a case in which the second period is longer than the first period, the second period including
(iv) a period taken to enable hardware reset cancellation of the second communication device,
(v) a period taken to enable software reset cancellation of the second communication device after the hardware reset cancellation of the second communication device is enabled, and
(vi) a period taken to complete initialization of the second physical layer circuit in the second communication device after the software reset cancellation of the second communication device is enabled.

3. The communication device according to claim 1, wherein
the set event is turning-on of the communication device.

4. The communication device according to claim 1, wherein the set event is occurrence of a link-down between the communication device and the second communication device.

5. The communication device according to claim 1, wherein
after the completion of the initialization of the first physical layer circuit, the first physical layer circuit set as the clock master transmits the clock signal to the second physical layer circuit set as the clock slave.

6. The communication device according to claim 2, wherein
the set event is turning-on of the communication device.

7. The communication device according to claim 2, wherein
the set event is occurrence of a link-down between the communication device and the second communication device.

8. The communication device according to claim 3, wherein
the communication device is connected through a power cable to a power supply that supplies power,
the communication device further comprises a connector-disconnector to switch between connection and disconnection of the power cable, the connector-disconnector being disposed on a path of the power cable disposed between the power supply and the communication device, and
the connector-disconnector connects the power cable to turn on the communication device.

9. The communication device according to claim 4, wherein
for detecting the occurrence of the link-down between the communication device and the second communication device, the first controller determines whether the communication line for connecting the communication device and the second communication device is connected, and
when determining that the communication line is not connected, after standing by until a first set time elapses, the first controller determines whether the communication line is connected.

10. The communication device according to claim 9, wherein
when determining that the communication line is not connected after the first controller stands by until the first set time elapses, as often as the first set time elapses, the first controller determines whether the communication line is connected.

11. The communication device according to claim 9, wherein
when determining that the communication line is connected after the first controller stands by until the first set time elapses, after standing by until a second set time elapses, the first controller initializes the first physical layer circuit.

12. The communication device according to claim 11, wherein
the first controller:
after initialization of the first physical layer circuit, determines whether communication with the second communication device is restarted; and
when determining that the communication with the second communication device is not restarted, as often as the first set time elapses, determines whether the communication line is connected.

13. A communication system comprising:
a first communication device; and
a second communication device,
wherein
the first communication device comprises:
a first physical layer circuit to transmit and receive signals, at a physical layer, to and from a second physical layer circuit in the second communication device connected to the first physical layer circuit through a communication line, the first physical layer circuit being set as a clock master that is a supply source of a clock signal defining timing for transmitting and receiving signals to and from the second physical layer circuit; and
a first controller to, in response to detection of a set event, stand by for a set period for completion of initialization of the second physical layer circuit in the second communication device set as a clock slave and complete initialization of the first physical layer circuit after the completion of the initialization of the second physical layer circuit, and then to control the first physical layer circuit so that the first physical layer circuit transmits the clock signal to the second physical layer circuit,
the second physical layer circuit in the second communication device to transmits and receives signals, at the physical layer, to and from the first physical layer circuit at timing indicated by the clock signal, and
the set period is a sum of a first period and a predetermined stand-by period, the first period including
(i) a period taken to enable hardware reset cancellation of the first communication device,
(ii) a period taken to enable software reset cancellation of the first communication device after the hardware reset cancellation of the first communication device is enabled, and
(iii) a period taken to complete initialization of another physical layer circuit other than the first physical layer circuit after the software reset cancellation of the first communication device is enabled, the another physical layer circuit being set as a clock slave and included in the first communication device.

14. The communication system according to claim 13, wherein
the set event is turning-on of the first communication device.

15. The communication system according to claim 13, wherein
the set event is occurrence of a link-down between the first communication device and the second communication device.

16. The communication system according to claim 15, wherein
for detecting the occurrence of the link-down between the communication device and the second communication device, the first controller determines whether the communication line for connecting the first communication device and the second communication device is connected, and
when determining that the communication line is not connected, after standing by until a first set time elapses, the first controller determines whether the communication line is connected.

17. The communication system according to claim 16, wherein
when determining that the communication line is not connected after the first controller stands by until the first set time elapses, as often as the first set time elapses, the first controller determines whether the communication line is connected.

18. The communication system according to claim 16, wherein when determining that the communication line is connected after the first controller stands by until the first set time elapses, after standing by until a second set time elapses, the first controller initializes the first physical layer circuit.

19. The communication system according to claim 18, wherein the first controller:

after initialization of the first physical layer circuit, determines whether communication with the second communication device is restarted; and when determining that the communication with the second communication device is not restarted, as often as the first set time elapses, determines whether the communication line is connected.

20. A non-transitory computer-readable recording medium storing a program for a first computer including a first physical layer circuit set as a clock master to transmit, to a clock slave, a clock signal defining timing for transmitting and receiving signals at a physical layer, the program causing the first computer to:

detect a set event; and in response to detection of the set event, stand by for a set period for completion of initialization of a second physical layer circuit set as the clock slave and complete initialization of the first physical layer circuit after the completion of the initialization of the second physical layer circuit, the second physical layer circuit being a physical layer circuit in a second computer connected to the first physical layer circuit through a communication line, wherein the set period is a sum of a first period and a predetermined stand-by period, the first period including (i) a period taken to enable hardware reset cancellation of the first computer, (ii) a period taken to enable software reset cancellation of the first computer after the hardware reset cancellation of the first computer is enabled, and (iii) a period taken to complete initialization of another physical layer circuit other than the first physical layer circuit after the software reset cancellation of the first computer is enabled, the another physical layer circuit being set as a clock slave and included in the first computer.

* * * * *